Oct. 20, 1959     L. P. FLATLAND     2,908,976
DENTAL HANDPIECE ATTACHMENT
Filed Nov. 13, 1956
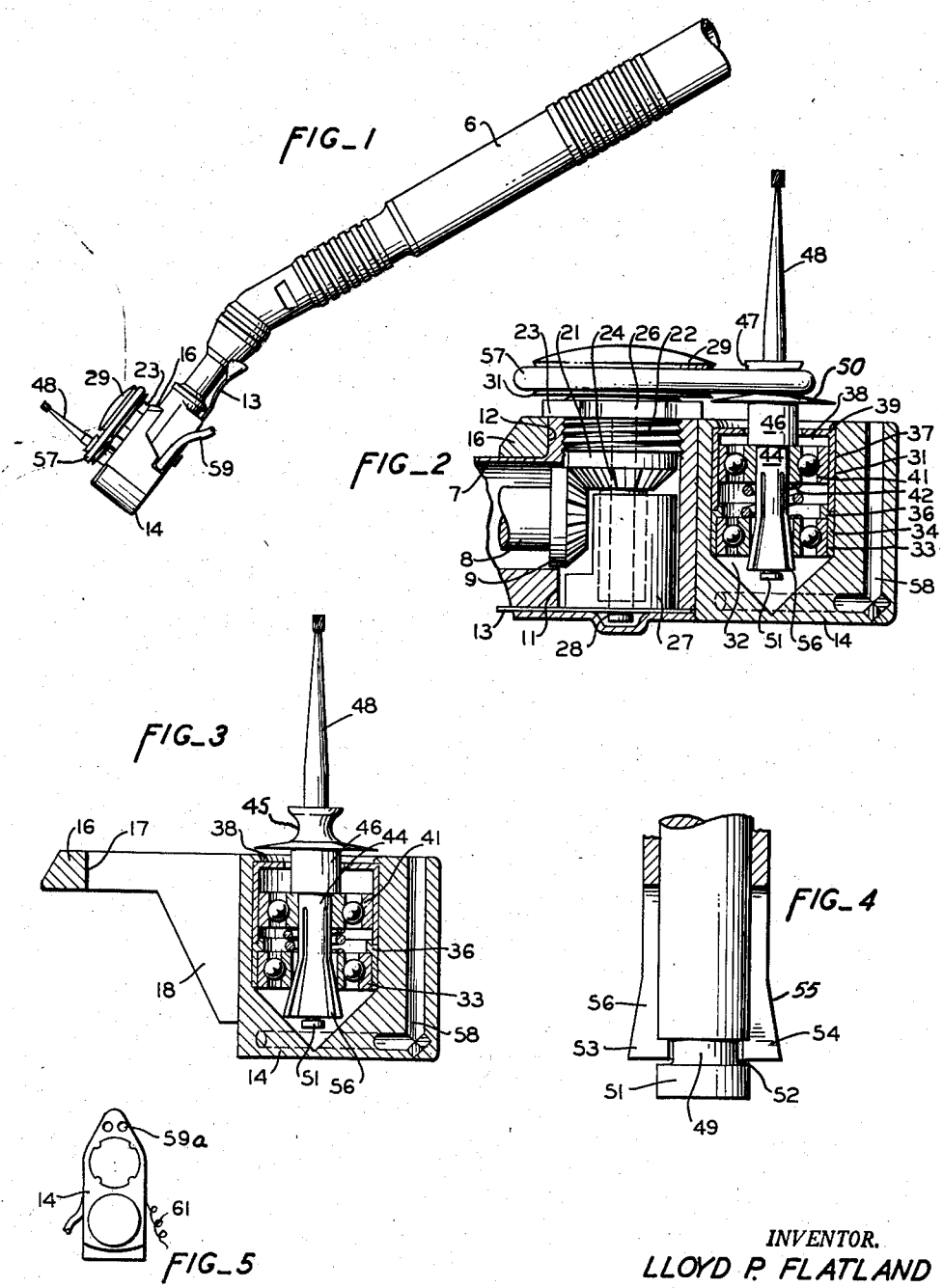
INVENTOR.
LLOYD P. FLATLAND
BY *Lothrop & West*
ATTORNEYS

United States Patent Office 2,908,976
Patented Oct. 20, 1959

2,908,976

DENTAL HANDPIECE ATTACHMENT

Lloyd P. Flatland, San Francisco, Calif.

Application November 13, 1956, Serial No. 621,760

7 Claims. (Cl. 32—27)

In recent years it has become increasingly desirable to augment the speed of dental cutting tools such as grinders and burrs. It has been ascertained that burrs rotating at relatively high speeds; for example, in excess of 80,000 revolutions per minute, and at speeds of the order of 100,000 revolutions per minute, are in effect painless in that they appear to provide impulses at a frequency which is beyond the threshold of pain, or of an amplitude outside the range of painful feeling. While much dental equipment is provided with driving mechanism adequately effective so far as power is concerned, such equipment is not effective to operate at the newly preferred, relatively high speeds.

It is therefore an object of my invention to provide an attachment for a dental handpiece effective to utilize the driving force of the mechanism available in the handpiece yet to afford a much higher speed of operation of the dental tool, such as a burr.

Another object of my invention is to provide an attachment for a dental handpiece which can readily be installed and removed.

A further object of the invention is to provide a dental handpiece which does not increase objectionably the bulk or contour of the handpiece.

Another object of the invention is to provide a dental handpiece attachment in which cutting tools such as burrs can readily be installed and removed.

A further object of the invention is to provide a high speed operating mechanism as an attachment to a dental handpiece.

Another object of the invention is to provide a dental handpiece attachment in which the relatively high speed of operation does not produce any deleterious effects such as excessive heat.

A still further object of the invention is in general to provide an improved dental handpiece attachment.

Other objects together with the foregoing are attained in the embodiment of the invention described in the accompanying description and illustrated in the accompanying drawings, in which:

Figure 1 is a side elevation of a dental handpiece with the attachment of the invention installed thereon.

Figure 2 is a cross-section on a longitudinal, median plane, to an enlarged scale, of the end of the handpiece of Figure 1 with the attachment thereon.

Figure 3 is a view comparable to Figure 2 yet showing the attachment by itself and in a slightly different position.

Figure 4 is a partial cross-section to an enlarged scale of the collet end of the driven shaft of the attachment.

Figure 5 is a diagrammatic plan of part of the attachment, various portions being removed for clarity of disclosure.

The attachment of the invention is primarily designed to be utilized in connection with a dental handpiece 6. As illustrated, this is a contra angle handpiece although any similar mechanism is suitable for use in connection with the attachment. The handpiece 6 is inclusive of a hollow body 7 within which a drive shaft 8 is rotated at the usual speed. The end of the drive shaft terminates in a bevel gear 9 largely disposed within a bore 11 of circular cylindrical contour having its axis transverse to the axis of the rotation of the shaft 8. The bore is formed in the transversely extending end portion of the handpiece 6. This portion is usually formed with a hub 12 of exterior circular cylindrical contour projecting laterally from the body 7. Also afforded in connection with the handpiece 6 and operating in a space for that purpose is a latch 13 movable by the operator into and out of the lower portion of the bore 11 and customarily provided for engagement with or release from the usual retention groove in the butt of a dental burr.

In accordance with the invention there is provided an attachable housing 14 preferably constructed of metal such as aluminum in order to be light and to conduct away rapidly any developed heat. The housing 14 is characterized by the provision of a ring 16 having a circular cylindrical interior bore 17 of a size to fit snugly over the hub 12. The contour of the attachment may be such that side wings 18 abut corresponding flattened portions of the handpiece so that when the ring 16 is in engagement with the hub 12 the attachment housing 14 is well and firmly located.

To secure the housing in position there is preferably provided a bushing 21 having threads 22 formed thereon for interengagement with corresponding threads in the interior of the bore 11. A flange 23, preferably non-circular or hexagonal in shape, not only serves as a nut so that the bushing can be screwed tightly into the recess but also slightly overlies the ring 16 portion of the housing 14 to clamp the ring 16 against the handpiece.

Operating within the bushing 21 and also abutting the bushing to transfer thrust is a bevel gear 24 meshing with the gear 9 and being substantially of the same diameter so as to partake of substantially the same rotational speed. A driving shaft 26 is rotatable within the bushing 21 and is engaged by the bevel gear 24 to be rotated therewith. This driving shaft is also located by a spacer block 27 within the bore 11 and is formed with a groove 28 in its lower or butt end for engagement with the latch 13 in a fashion similar to the interengagement therewith of a burr. At its other, outer end the driving shaft 26 is fixed to a first driving pulley 29 having a dome-like or rounded outer face and including a groove 31 for the reception of a driving belt.

The housing 14 is provided with a circular cylindrical recess 31 the axis of which is substantially parallel to that of the drive shaft 26. The recess is formed with a ledge 32 at its lower end against which a first anti-friction bearing 33 is abutted. The first anti-friction bearing 33 is confined against the ledge 32 by a first shell 34 fitting within the bore and having an inturned portion 36 resting against the outer race of the bearing. In turn, a second shell 37 rests against the first shell and is provided with an inturned closing flange 38. Upon assembly this flange is positioned and confined by indentations 39 struck out from the displaceable material of the housing 14. In this fashion the first bearing 33 is located and held precisely in position. A second anti-friction bearing 41 is slidably mounted within the second shell 37 and is normally urged away from the first bearing by an interposed expansion spring 42 resting against the inner races of both of the bearings.

Passing through both of the bearings is a hollow driven shaft 44 having a shoulder 46 resting against the inner race of the second bearing and also having a second pulley 47 formed thereon. This second pulley has a groove 45 in approximate alignment with the groove 31 of the first pulley but the effective diameter of the driven pulley is approximately a third or less the diameter of the driving pulley so that there is approximately a three to one speed increase. The pulley 47 is contoured to afford a slinger 50 overlying and protecting the end of the recess in the housing 14.

Means are provided for holding in position a dental tool 48 such as the burr illustrated. This tool is of the standard kind having a groove 49 in the lower, butt end 51 thereof. The burr 48 passes entirely through the hollow driven shaft. The groove 49 therein is engaged by inturned teeth 52 formed at the extremities of each of several collet fingers 53 and 54 furnished in the lower end of the hollow driven shaft by means of slots 56 cut therein. The material of the driven shaft is somewhat springy so that the collet fingers 53 and 54 can be spread apart enough to release the teeth 52 from the groove 49. The exterior of the driven shaft in part of the zone of the collet fingers is enlarged in a wedge or conical section 55 having a changing diameter in part less than that of the interior bore of the inner race of the lower first bearing 33 and in part considerably greater than that of the interior bore.

With this arrangement, a user by depressing the slinger 50 or moving it toward the housing 14 causes the second bearing 41 to be displaced by the shoulder 46 in a direction to compress the spring and also to move the conical portion 55 out of the inner race of the lower bearing. The natural spring in the collet portion of the driven shaft causes the collet fingers to expand and the projections 52 to spread apart. While that position is retained, the user can introduce a burr 48 through the hollow drive shaft into a position so that the recess 49 is approximately in registry with the projections 52. Thereupon the slinger 48 is released and the spring 42 expands to lift the upper anti-friction bearing and so to displace the shoulder 46 and to force the conical collet portion into the interior bore of the lower bearing. This causes the springy collet teeth to converge and the projections 52 to become lodged in the recess 49. Thus the tool 48 is held in position against axial displacement and also is frictionally engaged by the collet interior tightly enough so that it rotates in unison with rotation of the driven shaft.

To afford the appropriate rotation, the first and second pulleys are interconnected by a belt 57 conveniently made of an O ring of rubber or rubber-like material deformed to run within the grooves 31 and 45. The flexibility of the O ring is such that the slinger 50 can be depressed and lifted with only minor lateral distortion of the belt. Also the round belt in connection with the rounded adjacent portions is not dangerous to a patient on whom the attachment is utilized.

In order to assist in dissipating heat from the high speed mechanism as well as from near the site of the use of the burr, the housing 14 is perferably provided with a drilled conduit 58 to which a water tube 59 can be secured so that water can be circulated through the housing in order to absorb heat therefrom, in part, and also to be discharged adjacent the site of the burr operation. Also, the housing is provided with a mounting bore 59a for an electric light supplied with current through a conductor 61.

With this mechanism, an ordinary handpiece 6 can be provided with an attachment so that the driving mechanism of the handpiece is geared or connected to a dental burr for revolving the burr at three or more times its previous rate of rotation. The attachment is firmly held in place and the burr is readily introduced and removed. The structure is small and smooth in compass so as not to make the work more awkward and is provided further with a cooling means. In the event any debris collects within the recess 14 the burr 48 can be removed and water or other liquid flushed through the bearings to clean and lubricate the recess interior.

What is claimed is:

1. An attachment for a dental contra angle head, said attachment comprising; a housing detachably mounted on the contra angle head, the head including a pair of meshing bevel gears; a drive shaft coaxially disposed within and rotated by one of said gears; a first pulley connected to said drive shaft for rotation thereby; a driven shaft having a collet rotatably mounted in a recess in said housing; a second pulley mounted on said driven shaft exteriorly of said recess substantially coplanar with said first pulley; and means for transferring the rotation of said first pulley to said second pulley.

2. A high speed attachment for a dental contra angle head having a burr latch, and means for rotating a burr, said attachment comprising: a drive shaft mounted in said rotating means and latchable by said latch; a first pulley mounted on said shaft, said first pulley having a predetermined diameter; a housing mounted on said angle head, said housing having a recess therein; a collet rotatably mounted in a pair of spaced anti-friction bearings in said recess; a second pulley mounted on one end of said collet for rotation therewith, said second pulley having a diameter smaller than said predetermined diameter of said first pulley; and means for transmitting rotation of said first pulley to said second pulley.

3. A dental handpiece having a bore with a bevel pinion projecting therein, a bushing in said bore, a drive shaft in said bushing, a bevel gear fast on said drive shaft and meshing with said bevel pinion, a driving pulley fast on said drive shaft, a housing on said handpiece and having a recess, bearings in said recess, a hollow shaft in said bearings, said hollow shaft being axially movable relative to one of said bearings between a first position and a second position, means on said hollow shaft for engaging a dental burr in said first position of said hollow shaft, means for disengaging a dental burr in said second position of said hollow shaft, a driven pulley on said hollow shaft, and means for connecting said driving pulley and said driven pulley.

4. A dental handpiece having a hub provided with a bore and a bevel pinion projecting therein, a housing having a recess therein and abutting said handpiece and having a ring encompassing said hub, a bushing threaded into said bore and having a flange overlying said ring, a drive shaft in said bushing, a bevel gear fast on said drive shaft and meshing with said bevel pinion, a driving pulley fast on said drive shaft, bearings in said recess, a driven shaft in said bearings, means on said driven shaft for engaging a dental burr, a driven pulley on said driven shaft, and a belt connecting said driving and driven pulleys.

5. A dental handpiece comprising a hub having a bore, a bevel pinion projecting into said bore, a housing having a recess therein parallel to said bore, a ring on said housing encompassing said hub, a bushing threaded into said bore and having a flange abutting said ring, a drive shaft in said bushing, a bevel gear fast on said drive shaft and meshing with said bevel pinion, bearings in said recess, a driven shaft in said bearings, means on said driven shaft for engaging a dental burr, and means for transmitting driving force from said drive shaft to said driven shaft.

6. As an attachment for a dental handpiece having a hub, a housing having a recess thereon, a planar ring on said housing for engagement with a dental handpiece, bearings in said recess, a hollow driven shaft in said bearings, means on said hollow shaft for engaging a dental burr, and means on said hollow driven shaft for receiving a driving force in a plane substantially parallel to the plane of said ring.

7. A dental handpiece comprising a housing having a recess therein, a first bearing disposed in said recess and fixed in said housing against axial movement, a second bearing disposed in said recess and axially slidable in said housing, a hollow driven shaft movable through said first bearing, a flared collet end on said hollow driven shaft movable into abutment with said first bearing, a shoulder on said hollow driven shaft, and a spring abutting said first and second bearings for urging said second bearing against said shoulder and said collet end against said first bearing.

References Cited in the file of this patent
UNITED STATES PATENTS 2,732,622  La Hirt _____ Jan. 31, 1956

FOREIGN PATENTS 743,771  Germany _____ Jan. 3, 1944